United States Patent
Bhatia et al.

(10) Patent No.: US 9,602,453 B2
(45) Date of Patent: Mar. 21, 2017

(54) SMART ATTACHMENT TO ELECTRONIC MESSAGES

(75) Inventors: Dimple Bhatia, San Jose, CA (US); Vandana Mallempati, Austin, TX (US); Jehan Moghazy, Arlington, VA (US); Suparna Sinha Roy, Round Rock, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 13/024,687

(22) Filed: Feb. 10, 2011

(65) Prior Publication Data

US 2012/0209922 A1    Aug. 16, 2012

(51) Int. Cl.
*G06F 15/16* (2006.01)
*H04L 12/58* (2006.01)
*H04L 29/06* (2006.01)

(52) U.S. Cl.
CPC ............. *H04L 51/08* (2013.01); *H04L 12/58* (2013.01); *H04L 51/18* (2013.01); *H04L 69/22* (2013.01)

(58) Field of Classification Search
CPC ......... H04L 51/08; H04L 12/58; H04L 51/18; H04L 69/22
USPC ........................................................ 709/206
See application file for complete search history.

(56) References Cited

U.S. PATENT DOCUMENTS

| | | | |
|---|---|---|---|
| 7,117,210 B2 | 10/2006 | DeSalvo | |
| 7,296,060 B2 | 11/2007 | Walsh | |
| 7,634,546 B1 * | 12/2009 | Strickholm et al. | 709/207 |
| 8,301,707 B1 * | 10/2012 | Hebb | G06Q 10/10 709/206 |
| 8,335,828 B2 * | 12/2012 | Saito | 709/206 |
| 8,676,273 B1 * | 3/2014 | Fujisaki | 379/142.06 |
| 2003/0115273 A1 | 6/2003 | Delia et al. | |
| 2004/0109542 A1 | 6/2004 | Baxter, Jr. | |
| 2004/0153436 A1 * | 8/2004 | Pope et al. | 707/1 |
| 2006/0168543 A1 * | 7/2006 | Zaner-Godsey et al. | 715/835 |
| 2007/0038710 A1 | 2/2007 | Li et al. | |
| 2007/0073776 A1 * | 3/2007 | Kalalian et al. | 707/104.1 |
| 2007/0112744 A1 * | 5/2007 | Arrouye et al. | 707/3 |
| 2007/0143699 A1 * | 6/2007 | Jaeger | 715/764 |
| 2007/0249376 A1 * | 10/2007 | Ogura et al. | 455/466 |
| 2008/0020735 A1 * | 1/2008 | Bumiller | 455/412.1 |
| 2008/0294735 A1 * | 11/2008 | Muntermann | H04L 12/5855 709/206 |

(Continued)

OTHER PUBLICATIONS dBforums.com. A division of iNET Interactive. 2001-2003. Date last accessed: Dec. 2, 2010 <http://web.archive.org/web/20041125053102/www.dbforums.com/showthread.php?t=885313>.

(Continued)

*Primary Examiner* — Minh-Chau Nguyen
(74) *Attorney, Agent, or Firm* — Alexander G. Jochym

(57) ABSTRACT

Aspects of the present invention associate an unsent electronic message with a target file that is attached to a first stored electronic message. A command to attach a file to the unsent electronic message is received. A list identifying one or more files attached to one or more stored electronic messages is displayed. The target file is one of the one or more files. An input identifying the target file is received. One of the target file and a file that identifies a location of the target file on a storage device is attached to the unsent electronic message.

17 Claims, 6 Drawing Sheets

(56) References Cited

U.S. PATENT DOCUMENTS

| | | | |
|---|---|---|---|
| 2009/0037407 A1* | 2/2009 | Yang | G06Q 10/107 715/777 |
| 2009/0112999 A1* | 4/2009 | Nicholas | G06Q 10/107 709/206 |
| 2009/0216843 A1* | 8/2009 | Willner et al. | 709/206 |
| 2010/0011075 A1* | 1/2010 | Klassen et al. | 709/206 |
| 2010/0248756 A1* | 9/2010 | Oshima et al. | 455/466 |
| 2011/0066687 A1 | 3/2011 | Chen et al. | |
| 2011/0314384 A1* | 12/2011 | Lindgren | G06Q 10/107 715/739 |
| 2012/0054285 A1* | 3/2012 | Garg | 709/206 |

OTHER PUBLICATIONS

Experts Exchange, LLC. 2011. Date last accessed: Dec. 2, 2010 <http://www.experts-exchange.com/Software/Office_Productivity/Office_Suites/Lotus_SmartSuite/Lotus_Notes/Q_20038806.html>.

* cited by examiner

SMART ATTACHMENT TO ELECTRONIC MESSAGES

BACKGROUND

The disclosure relates generally to electronic messages and more specifically to a method, computer program product, and computer system for associating an unsent electronic message with a file that is attached to a stored electronic message.

The Internet is a global network of computers and networks joined together by gateways that handle data transfer and the conversion of messages from a protocol of a sending network to a protocol used by a receiving network. On the Internet, computers may communicate with other computers. Information between computers travels over the Internet through a variety of languages also referred to as protocols. A set of protocols used on the Internet is called the Transmission Control Protocol/Internet Protocol (TCP/IP).

It is commonplace for users to send messages to other users through the Internet or other networks, a process which may be referred to as electronic messaging. A message sent in such a fashion may be referred to as an electronic message. An electronic message may often be put together in the form of an electronic mail messages. Electronic mail (e-mail) is a widely used format to communicate over the Internet. Other types of electronic messages include, for example, text messages, as used in many cell phones, and instant messages (IMs) that can be exchanged using, for example, IBM®'s Lotus Sametime® or AOL®'s AIM®. The use of electronic messaging is commonplace for personal and business use. Individuals use electronic messaging to keep in touch with and communicate with other users. Additionally, electronic messaging provides a medium to collaborate and exchange documents. Documents exchanged via electronic messaging are referred to herein as attachments or attached files.

Electronic messages may be exchanged between clients via servers. In some instances, such as in text messages, the server does little more than redirect an electronic message and any attached files to a receiving client. In other instances, such as in e-mail messages, the server plays a greater role that may include both enhanced functionality and storage for e-mail messages and any attached files.

Electronic messages that are electronic mail messages may be drafted using an electronic mail program on a computer. While a user is drafting an electronic mail message on the computer, other computers generally may not access the electronic mail message. In other words, the electronic mail message may be considered to be off-line. When the user desires to send the electronic mail message, the electronic mail program can transfer the electronic mail message from the computer on which the electronic mail message was drafted to an intermediate computer, such as a server computer for example. From the server computer, an electronic mail program on a computer of the electronic mail message's intended recipient may retrieve the electronic mail message. The terms "electronic mail message," "email message," "e-mail message," and "email" may be used interchangeably herein.

The process of transferring e-mail messages to and from a server computer may be referred to as replication. A first electronic mail program may replicate a message drafted on a first user's computer from the user's computer to the server computer. A second electronic mail program may then replicate the e-mail message from the server computer to a computer of the e-mail message's intended recipient. An electronic mail message program that commonly uses replication is Microsoft® Outlook®.

Another common technique for sending and receiving e-mail messages is for an electronic mail program to operate primarily at a server computer. For example, in a web-based electronic mail program (webmail), such as Google®'s Gmail®, a client may access the server computer and draft an e-mail message in a user-interface operating on the client computer. Upon "sending" the e-mail message, the server computer stores the e-mail message in association to a recipient client. In web-based electronic mail programs, a copy is not typically stored on the client computer. A recipient client computer may access the server and view the e-mail message in a user interface on the recipient client computer. The e-mail message need not be stored on the recipient client computer.

Some electronic mail programs, such as IBM®'s Lotus Notes®, are capable of both techniques at a user's discretion.

Electronic mail programs associate attached files with their respective e-mail messages and make both available to a recipient in accordance with the technique used for sending and receiving e-mail messages. To attach a file to an e-mail message, the user selects a document located at a specific location. An electronic mail program then uploads, or replicates, both the electronic mail message and the attached file from the user's computer to the server computer. A second electronic mail program may then replicate the e-mail message and the attached file from the server computer to a computer of the e-mail message's intended recipient. In the case of a web-based electronic mail program, a recipient computer may access the server computer to view the e-mail message and attached file in a web-based user interface, and may, at a recipient user's discretion, decide to save the e-mail message and/or attached file in local storage.

When a user of a recipient computer views an e-mail message, any attached files may be seen as file names, towards the top of the e-mail message, or as file icons, often within the text of the e-mail message. Though not seen by the user, each file name or icon maintains an association with a location of the stored file. Upon a selection of an attached file, the recipient client computer opens the file from the associated location. According to the different technique used to send and receive e-mail messages, storage may occur locally or on the server computer.

The user of the recipient computer may also forward a received e-mail message to another recipient or multiple recipients. The forwarded e-mail message may include any attached files associated with the received e-mail message. In this manner, the user of the recipient computer may send an attached file to other recipients without having to first download the attached file onto the recipient's computer. The attached file in the forwarded e-mail message simply continues to maintain the attached file's icon or name association with the server location in which the file is stored.

SUMMARY

In one aspect, a method for associating an unsent electronic message with a target file that is attached to a first stored electronic message. The method comprises a computer receiving a command to attach a file to the unsent electronic message. The method further comprises the computer, after receiving the command, displaying a list identifying one or more files attached to one or more stored electronic messages. The target file is one of the one or more files. The method further comprises the computer, after displaying the list, receiving an input identifying the target file. The method further comprises the computer, after receiving the input identifying the target file, attaching, to the unsent electronic message, one of the target file and a file that identifies a location of the target file on a storage device.

In another aspect, a computer program product for associating an unsent electronic message with a target file that is attached to a first stored electronic message. The computer program product comprises one or more computer-readable tangible storage devices. The computer program product further comprises program instructions, stored on at least one of the one or more storage devices, to receive a command to attach a file to the unsent electronic message. The computer program product further comprises program instructions, stored on at least one of the one or more storage devices to, after receiving the command, display a list identifying one or more files attached to one or more stored electronic messages. The target file is one of the one or more stored electronic messages. The computer program product further comprises program instructions, stored on at least one of the one or more storage devices to, after displaying the list, receive an input identifying the target file. The computer program product further comprises program instructions, stored on at least one of the one or more storage devices to, after receiving the input identifying the target file, attach, to the unsent electronic message, one of the target file and a file that identifies a location of the target file on a storage device.

In another aspect, a computer system for associating an unsent electronic message with a target file that is attached to a first stored electronic message. The computer system comprises one or more processors, one or more computer-readable memories, and one or more computer-readable tangible storage devices. The computer system further comprises program instructions, stored on at least one of the one or more storage devices for execution by at least one of the one or more processors via at least one of the one or more memories, to receive a command to attach a file to the unsent electronic message. The computer system further comprises program instructions, stored on at least one of the one or more storage devices for execution by at least one of the one or more processors via at least one of the one or more memories to, after receiving the command, display a list identifying one or more files attached to one or more stored electronic messages. The target file is one of the one or more stored electronic messages. The computer system further comprises program instructions, stored on at least one of the one or more storage devices for execution by at least one of the one or more processors via at least one of the one or more memories to, after displaying the list, receive an input identifying the target file. The computer system further comprises program instructions, stored on at least one of the one or more storage devices for execution by at least one of the one or more processors via at least one of the one or more memories to, after receiving the input identifying the target file, attach, to the unsent electronic message, one of the target file and a file that identifies a location of the target file on a storage device.

DETAILED DESCRIPTION

Figure 1:
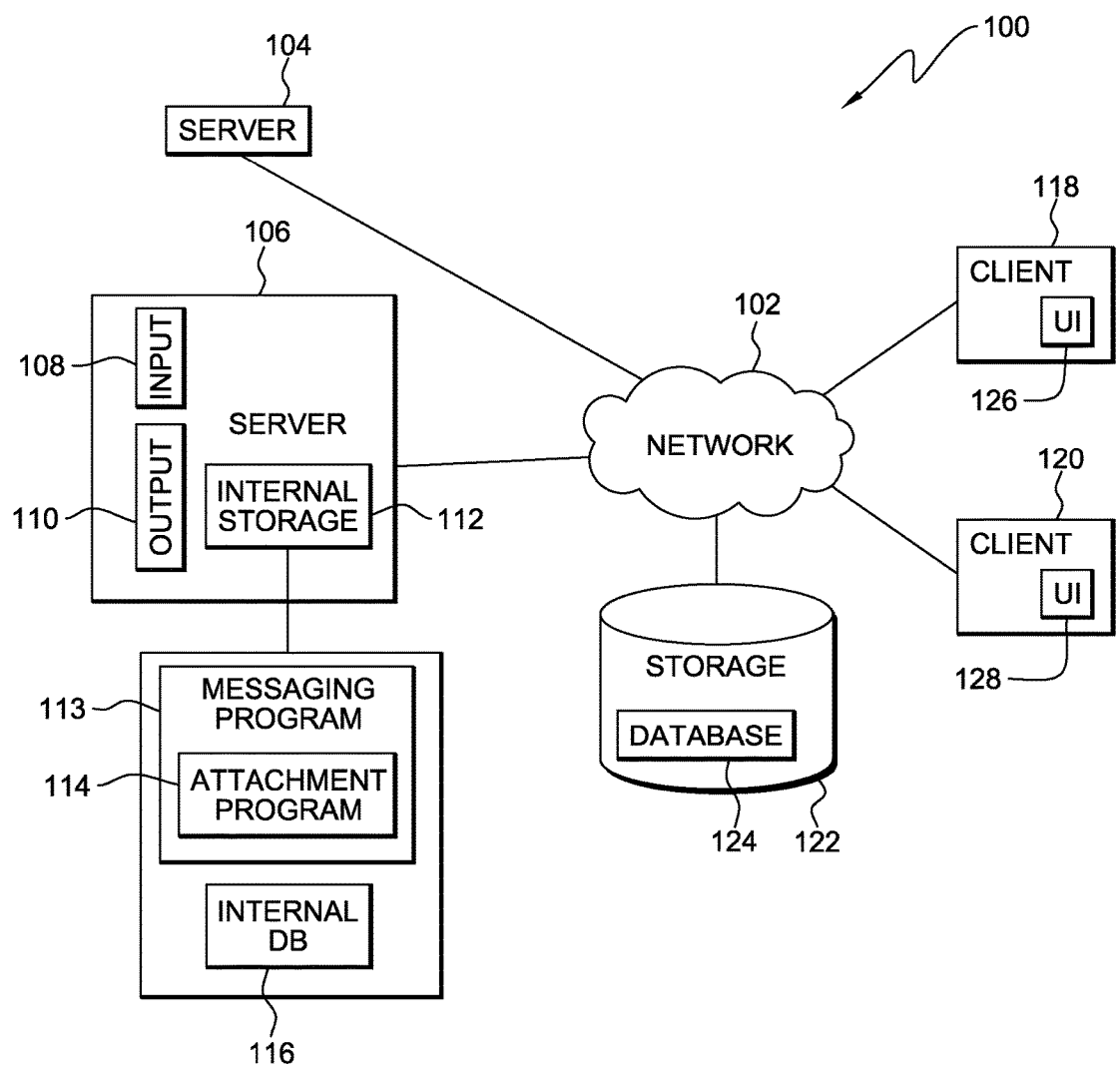
FIG. 1 is an illustration of a data processing environment depicted in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) having computer readable program code embodied thereon.

A computer readable storage device may be, for example, but not limited to, an electronic, magnetic, optical, electromagnetic, infrared, or semiconductor system, apparatus, device, or propagation medium, or any suitable combination of the foregoing. More specific examples (a non-exhaustive list) of the computer-readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage device may be any tangible device that can contain, or store a program for use by or in connection with an instruction execution system, apparatus, or device.

Program code embodied on a computer readable storage device may be transmitted using any appropriate medium, including but not limited to wireless, wireline, optical fiber cable, RF, etc., or any suitable combination of the foregoing.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in one or more computer readable storage devices that can direct a computer, other programmable data processing apparatus, or other devices to function in a particular manner, such that the instructions stored in the one or more computer readable storage devices produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 122. Client computers 118 and 120 connect to network 102. Client computers 118 and 120 may be, for example, mobile devices, telephones, cell phones, personal digital assistants, netbooks, laptop computers, tablet computers, desktop computers, and/or any other suitable computing devices that can send and receive e-mail messages and attachments. In the depicted example, server computer 106 provides information, such as boot files, operating system images, and applications to client computers 118 and 120. Server computer 106 may contain an input 108 and output 110 (an I/O device). Client computers 118 and 120 are clients to server computer 106 in this example. Client computers 118 and 120 may contain user interfaces (UIs) 126 and 128, respectively, that may process and display electronic messages and attached files as well as accept commands and data entry from a user. UIs 126 and 128 can be, for example, graphical user interfaces (GUIs) or web user interfaces (WUIs). Network data processing system 100 may include additional server computers, client computers, displays and other devices not shown.

Program code located in network data processing system 100 may be stored on one or more computer readable storage devices and downloaded to a data processing system or other device for use. For example, program code, such as messaging program 113 and attachment program 114, may be stored on a computer readable storage device such as internal storage 112 on server computer 106 and downloaded to client computer 118 over network 102 for use on client computer 118, and may include UI 126.

Messaging program 113 may be, for example, a program capable of reading, writing, sending, receiving, and displaying electronic messages, such as an electronic mail message program. Messaging program 113 may also include attachment program 114 for displaying, selecting and attaching files to an unsent electronic message.

In another embodiment, where messaging program 113 is a web based electronic mail program, messaging program 113 runs on server computer 106 instead of being downloaded to client computer 118. In this embodiment, the user may access messaging program 113 and included attachment program 114 through UI 126 or UI 128, which may be WUIs.

Data gathered, generated, and maintained for use by attachment program 114 may be kept in internal database 116 of server computer 106 or in database 124 of storage unit 122.

In the depicted example, network data processing system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages.

In these examples, client computer 118 may be a client data processing system that may receive and/or display an electronic message. Server computer 106 may include agents for sending and receiving electronic messages to and from client computers 118 and 120.

Messaging program 113 may employ different protocols depending upon the implementation. For example, in embodiments wherein messaging program 113 is an electronic mail program, messaging program 113 may employ the simple mail transfer protocol (SMTP). SMTP is a standard electronic mail protocol that utilizes Transmission Control Protocol/Internet Protocol. The SMTP protocol defines a format for the e-mail message and the agent that stores and transfers e-mail messages. Messaging program 113 may employ other protocols, such as for example, without limitation, post office protocol (POP), to internet message access protocol (IMAP), to send and receive e-mail messages.

Of course, network data processing system 100 also may be implemented as a number of different types of networks, such as, for example, an intranet, a local area network (LAN), or a wide area network (WAN). FIG. 1 is intended as an example, and not as an architectural limitation for the different embodiments.

Figure 2:
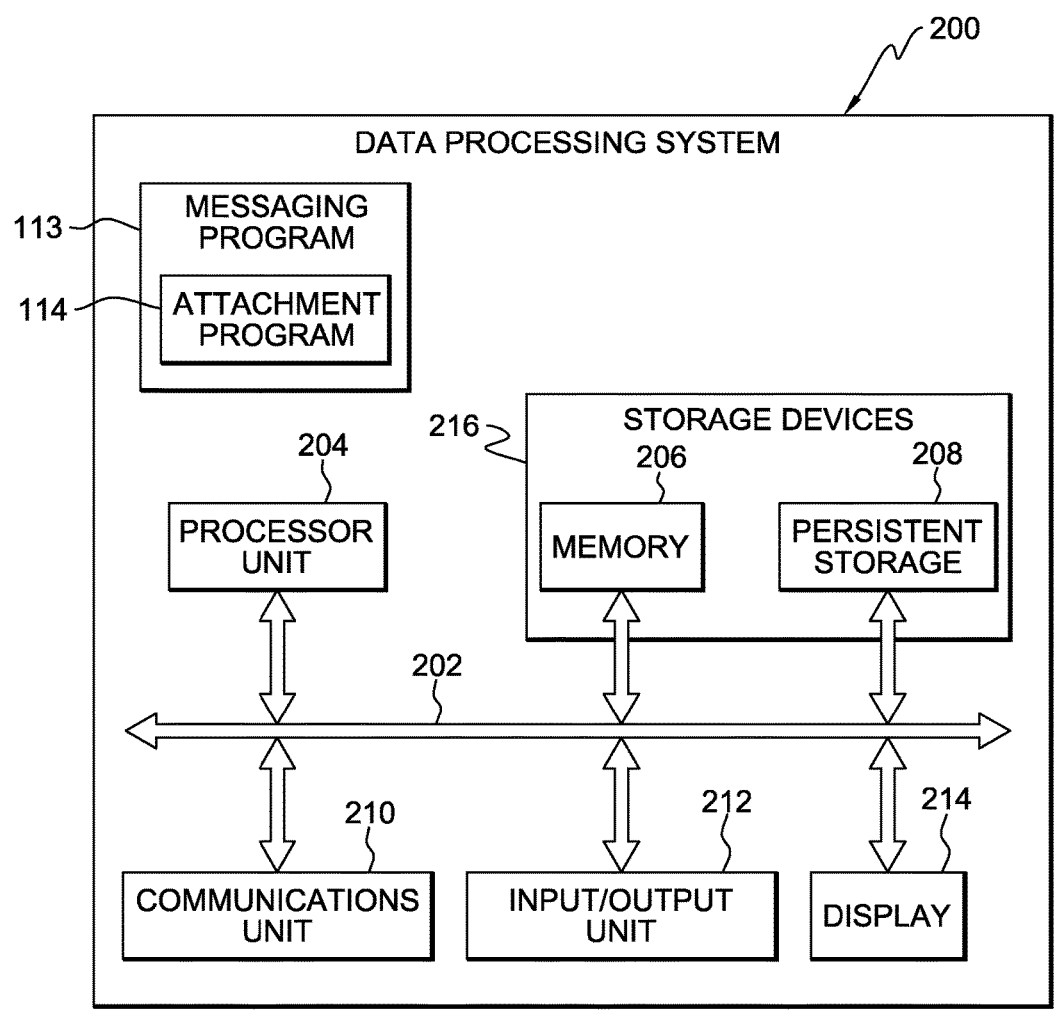
FIG. 2 is an illustration of a block diagram of a data processing system depicted in accordance with an illustrative embodiment.

Turning now to FIG. 2, a block diagram of a data processing system is depicted in accordance with an illustrative embodiment. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. Storage devices 216 are in communication with processor unit 204 through communications fabric 202.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, a microphone, and/or some other suitable input device. Further, input/output unit 212 may send output to a printer or to an external display. Display 214 provides a mechanism to display information to a user.

Instructions for an operating system, applications and/or programs, such as messaging program 113 and attachment program 114, may be located in one or more storage devices 216. The instructions may be in a functional form on persistent storage 208. These instructions may be loaded into memory 206 for execution by processor unit 204. The processes of the different embodiments may be performed by processor unit 204 using program instructions, which may be located in one or more memories that can include memory 206.

These program instructions may also be referred to as program code or computer readable program instructions. The program instructions may be read and run by processor unit 204. The program instructions in the different embodiments may be embodied on different physical or tangible computer readable storage devices, such as memory 206 or persistent storage 208.

In some embodiments, messaging program 113 and/or attachment program 114 may be downloaded over a network, such as network 102, to persistent storage 208 from another device or data processing system via communications unit 210 for use within data processing system 200. For instance, messaging program 113 and/or attachment program 114, when stored in a computer readable storage device in a server data processing system, may be downloaded over a network from the server to data processing system 200. The data processing system providing messaging program 113 and/or attachment program 114 may be a server computer, a client computer, or some other device capable of storing and transmitting attachment program 114.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 may be varied from the examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, attachment program 114 may be omitted because the processes for the different embodiments are implemented in a hardware unit.

In still another example, processor unit 204 may be implemented using a combination of processors found in computers and hardware units. Processor unit 204 may have a number of hardware units and a number of processors that are configured to run messaging program 113 and/or attachment program 114. With this depicted example, some of the processes may be implemented in the number of hardware units, while other processes may be implemented in the number of processors.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

In the course of developing the invention, the inventors found that to send, via e-mail, files attached to different stored e-mail messages, one could forward the different stored e-mail messages along with their attached files to a recipient. However, forwarding the different stored e-mail messages can disadvantageously clutter the recipient's e-mail inbox. Alternatively, one could detach, or download, the files attached to the different stored e-mail messages, and then re-attach the files to a new e-mail message. However, this alternative option not only unnecessarily uses hard drive space, but more importantly, takes unnecessary time and requires that a user remember various hard drive locations at which the files are stored.

The various embodiments provide a method, a computer program product, and a computer system for associating an unsent electronic message with a file that is attached to a stored electronic message. A computer, such as client 118 in FIG. 1, may receive a command to attach a file to the unsent electronic message. In a preferred embodiment, the unsent electronic message is an unsent e-mail message. A user may compose the electronic message in a user interface, such as UI 126 of FIG. 1, and may select to attach the file via the user interface. The computer may send a request for a list identifying one or more files attached to one or more stored electronic messages to a second computer. The second computer may be a server, such as server 106 of FIG. 1. In a preferred embodiment, the server is an e-mail server. The one or more files and the one or more stored electronic messages may be kept on the server, e.g., on internal storage 112 of FIG. 1, on a storage device external to the server, e.g. storage unit 122 of FIG. 1, or in another embodiment, on local storage of the computer. The target file is one of the one or more files. The computer may receive the list from the second computer. The computer may display the list, e.g., on the user interface. The user interface may allow the user to select at least one of the one or more files to attach to the unsent electronic message. The computer may receive an input identifying the target file. The user may enter the input through the user interface.

The computer, after receiving the input identifying the target file, may attach, to the unsent electronic message, one of the target file and a file that identifies a location of the target file on a storage device. An icon or a name can represent the one of the target file and the file that identifies the location of the target file within the user interface. The unsent electronic message may be sent or replicated from the computer to the second computer to form a sent electronic message. The one of the target file and the file that identifies the location of the target file may also be sent or replicated from the computer to the second computer. Alternatively, the one of the target file and the file that identifies the location of the target file may already reside on the second computer, and the file that identifies the location of the target file may identify the location as being on the second computer.

A recipient computer, such as client 120 of FIG. 1, can receive the sent electronic message from the second computer. A user of the recipient computer may view the sent electronic message, and may choose to view or download the one of the target file and the file that identifies the location of the target file. If the user chooses to view or download the file that identifies the location, the recipient computer may retrieve the target file from the location so that the user actually views or downloads the target file instead of the file that identifies the location.

Figure 3:
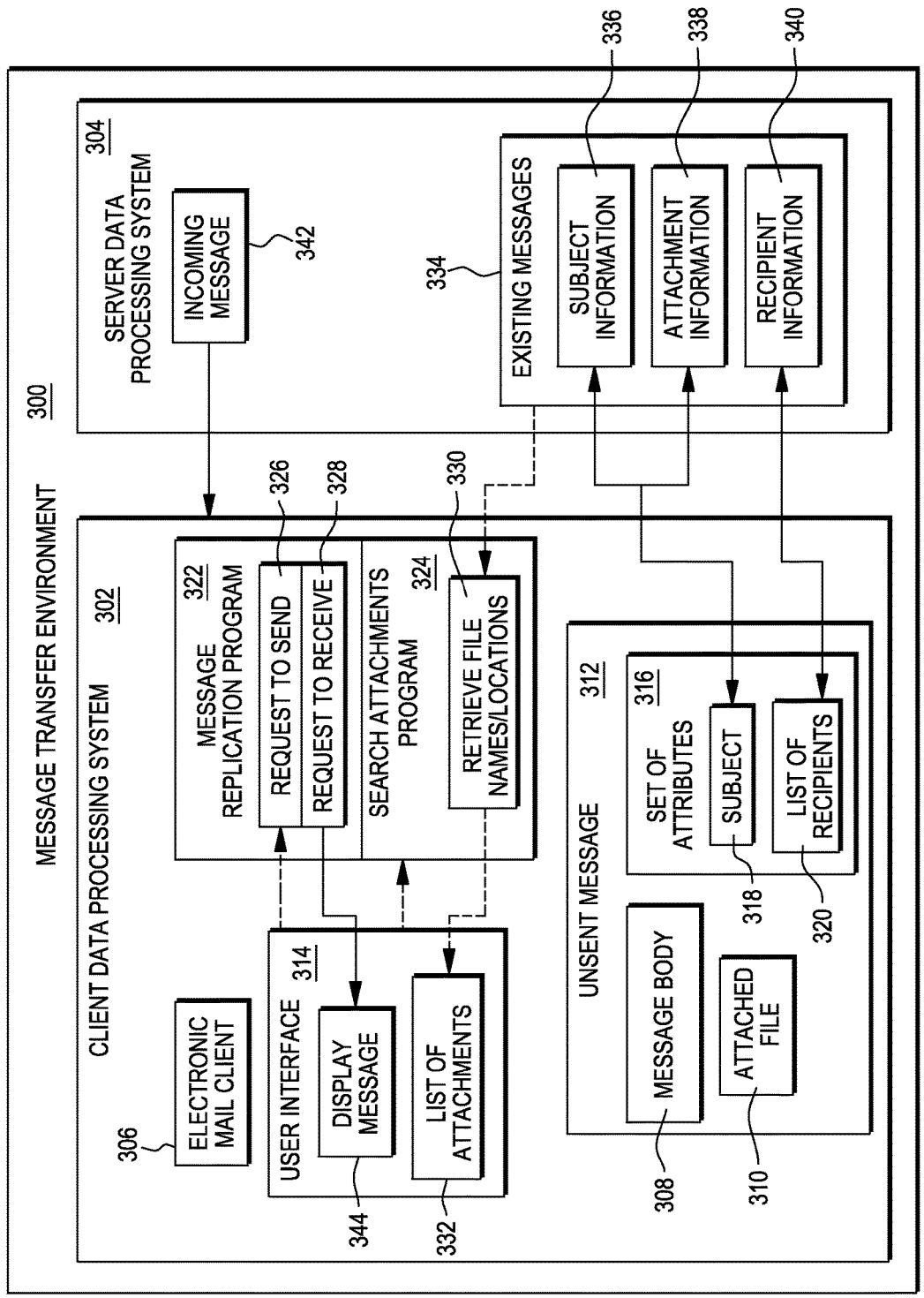
FIG. 3 is an illustration of a block diagram of a message transfer environment depicted in accordance with an illustrative embodiment.

With reference now to FIG. 3, an illustration of a block diagram of a message transfer environment is depicted in accordance with an illustrative embodiment. Message transfer environment 300 is an environment in which illustrative embodiments may be implemented. In these embodiments, message transfer environment 300 may be implemented in a network such as network 102 in FIG. 1. While message transfer environment 300 is described herein as an environment for transferring e-mail messages, one of skill in the art will appreciate that message transfer environment 300 is an environment for transferring other types of electronic messages, such as text messages and IMs, to which files may be attached.

Message transfer environment 300 may include client data processing system 302 and server data processing system 304. Client data processing system 302 is an example of client computer 118 in FIG. 1. Client data processing system 302 is also an example of data processing system 200 in FIG. 2. Client data processing system 302 may include electronic mail client 306, which is an example of messaging program 113 of FIG. 1. In another embodiment, electronic mail client 306 may be located on server data processing system 304. Electronic mail client 306 may send unsent message 312 with attached file 310, or receive incoming message 342 which may also include an attached file. Client data processing system 302 may be in communication with server data processing system 304 and may send e-mail messages and attachments to and receive e-mail messages and attachments from server data processing system 304.

Server data processing system 304 may be any suitable computer for sending data to and receiving data from other computers. Server data processing system 304 is an example of server computer 106 in FIG. 1. Server data processing system 304 is also an example of data processing system 200 in FIG. 2. Server data processing system 304 may be an electronic mail server for transferring e-mail messages to and from client devices, such as client data processing system 302. Server computer 106 in FIG. 1 may be an IBM® Lotus® Domino® server commercially available from IBM® Corporation or a Microsoft® Exchange® server commercially available from Microsoft® Corporation.

Unsent message 312 may be a message being drafted at client data processing system 302. Unsent message 312 may be drafted by a user of client data processing system 302 using user interface 314. User interface 314 may be a GUI or a WUI, and may be a user interface of a client-based e-mail application, such as Microsoft® Outlook® or IBM® Lotus Notes®, or to a server-based e-mail application, such as Hotmail®, Gmail®, or Yahoo® mail. Unsent message 312 may include message body 308 and attached file 310 to be sent to server data processing system 304. In embodiments wherein user interface 314 is a user interface to a server-based e-mail application, client data processing system 302 may be devoid of electronic mail client 306. In other examples, unsent message 312 may be any type of electronic message to which a file may be attached, such as a text message or IM, drafted by a user at client data processing system 302 to be sent to server data processing system 304.

Unsent message 312 may include set of attributes 316. As used herein, a set when referring to items means one or more items. Set of attributes 316 are attributes in unsent message 312 that may be used to identify unsent message 312. In this example, set of attributes 316 includes subject 318 and list of recipients 320. Subject 318 may be information regarding a general topic of unsent message 312. For example, subject 318 may include information in a subject field of unsent message 312. In other examples, subject 318 may be information in message body 308 in unsent message 312.

List of recipients 320 may be a list of electronic mail addresses for intended recipients of unsent message 312. For example, list of recipients 320 may be a list of one or more electronic mail addresses found in any one or more of a "To," "Cc," and "Bcc" field of unsent message 312. In other examples, list of recipients 320 may be a list identifying an internet protocol address of server data processing system 304, or a uniform resource locator (URL) of an address of for a website. In other instances, such as when the electronic message is a text message or IM, list of recipients 320 may be a list of one or more phone numbers, IM nicknames, or other identifying information identifying a recipient of the message.

Client data processing system 302 may include message replication program 322. Message replication program 322 is a computer program that may replicate electronic messages in client data processing system 302. For example, message replication program 322 may send e-mail messages to server data processing system 304 and receive e-mail messages from server data processing system 304. Message replication program 322 may be part of electronic mail client 306. In embodiments wherein user interface 314 is a user interface to a server-based e-mail application, client data processing system 302 may be devoid of message replication program 322.

Message replication program 322 may receive a request to send (326) unsent message 312. Request to send 326 is a request to replicate or otherwise send unsent message 312 to server data processing system 304. The user composing unsent message 312 may provide request to send 326 through user interface 314. For example, request to send 326 may be a user selection of a "send" command in an electronic mail program. Request to send 326 may also be a request to post, share, and/or any other suitable command indication that the user desires for unsent message 312 to be sent to server data processing system 304.

Prior to sending drafted message 312 to an intended recipient, e.g., via server data processing system 304, search attachment program 324 may send a request for names and locations of attached files to server data processing system 304 and receive the names and locations of the attached files from server data processing system 304. Search attachment program 324, is an example of attachment program 114 in FIG. 1. In one embodiment, the attached files may be associated with electronic messages stored within a requester's account on server data processing system 304. In another embodiment, the attached files may be associated with electronic messages stored in a specific folder, such as "inbox," within a requester's account. In another embodiment still, wherein the attached files are stored locally on the client data processing system 302, the names and locations of the attached files are requested and received from client data processing system 302. A request to retrieve file names and file locations 330 may come from user interface 314 and the names and locations of the attached files may be displayed in list of attachments 332 on user interface 314.

When user interface 314 displays the list of attachments 332, for clarity and efficiency, the list may be sorted according to characteristics or attributes, such as the set of attributes 316 associated with unsent message 312. Search attachments program 324 may compare subject 318 with subject information 336 and attachment information 338 to determine whether unsent message 312 has subject matter similarity with any stored e-mail messages or attached files associated with the stored e-mail messages in existing messages 334. Attachment information 338 may include subject information of attached files associated with the stored e-mail messages in existing messages 334 and may be stored as text, key words, phrases, tags, and the like.

For example, search attachment program 324 may determine whether text in subject 318 is the same or similar to text in subject information 336. In this manner, attached files associated with a contextually similar stored e-mail message in existing messages 334 may be displayed higher in the list of attachments 332 than attached files associated with stored e-mail messages in existing messages 334 that are not contextually similar or as contextually similar. In comparing, search attachment program 324 may disregard a prefix of subject 318 and/or a prefix in subject information 336. For example, search attachment program 324 may disregard prefixes such as "Re:" "Fw:" and/or other prefixes.

As another example, text in subject 318, from either the subject line or the body of unsent message 312, may be reduced to key words or phrases. Search attachment program 324 may then compare the key words or phrases to key words or phrases in subject information 336 or key words or phrases or tags in attachment information 338.

In addition to or as an alternative, search attachment process 324 may also consider list of recipients 320 in determining whether unsent message 312 is contextually similar to any existing e-mail messages or attached files associated with stored e-mail messages in existing messages 334. Search attachment process 324 may require exact matches between list of recipients 320 and recipient information 340 (which may include an electronic mail address or other identifying information indicating who an existing e-mail message was sent to). In other examples, a certain number of or percentage of common recipients may be required. In other embodiments, recipient information 340 may include phone numbers, IM nicknames, or other identifiers of recipients.

Client data processing system 320 may receive an input identifying attached file 310. A user may have selected attached file 310 from list of attachments 332 displayed in user interface 314. In embodiments wherein attached file 310 is stored on client data processing system 302, after client data processing system 302 receives the input, search attachments program 324, electronic mail client 306, or a web-based electronic messaging program such as a web-based e-mail program may attach attached file 310 to unsent message 312 and may show attached file 310 as an icon or file name in user interface 314. In embodiments wherein attached file 310 is stored on server data processing system 302, after client data processing system 302 receives the input, search attachments program 324 or a web-based electronic messaging program such as a web-based e-mail program may attach a file identifying a location of attached file 310 on server data processing system 302 to unsent message 312 and may show the file as an icon or file name in user interface 314. Also in embodiments wherein attached file 310 is stored on server data processing system 302, when a user opens the file, e.g., by clicking on the icon or file name in a user interface, attached file 310 may be downloaded from the location to a client and may be viewed on the client. The client may be client data processing system 302 or a client receiving unsent message 312 after unsent message 312 has been sent.

Alternatively, in embodiments wherein attached file 310 is stored on server data processing system 302, search attachments program 324 or a web-based electronic messaging program such as a web-based e-mail program may replicate attached file 310 from server data processing system 304 to client data processing system 302 and embed attached file 310 in unsent message 312. When unsent message 312 is sent, unsent message 312 and attached file 310 are replicated to server data processing system 302. In such embodiments, there would be at least two copies of attached file 310 in server data processing system 304, and there may be an additional copy of attached file 310 on client data processing system 302.

Message replication program 322 may also request to receive 328 any incoming e-mail messages, such as incoming message 342 on server data processing system 304. After retrieval, incoming message 342 may be displayed 344 on user interface 314. In addition, client data processing system 302 may scan text of any attached files to incoming message 342 and add tags and/or allow a user to add tags to the attached file. When incoming message 342 is stored on server data processing system 304, search for attachments program 324 may store these tags as attachment information 338 for future use. In another embodiment, it may be server data processing system 304 which scans the attached file text and adds tags to the attached file.

The depiction of message transfer environment 300 in FIG. 3 is not meant to imply physical or architectural limitations to the manner in which different features may be implemented. Other components in addition to and/or in place of the ones illustrated may be used. Some components may be unnecessary in some embodiments. Also, the blocks are presented to illustrate some functional components. One or more of these blocks may be combined and/or divided into different blocks when implemented in different embodiments.

For example, existing messages 334 may in one embodiment actually be stored on client data processing system 302 and not server data processing system 304. In such an embodiment, attached file 310 may be uploaded or replicated to server data processing system 304 when a request to send 326 is given because attached file 310 will not already have a file location on the server data processing system 304.

Figure 4A:
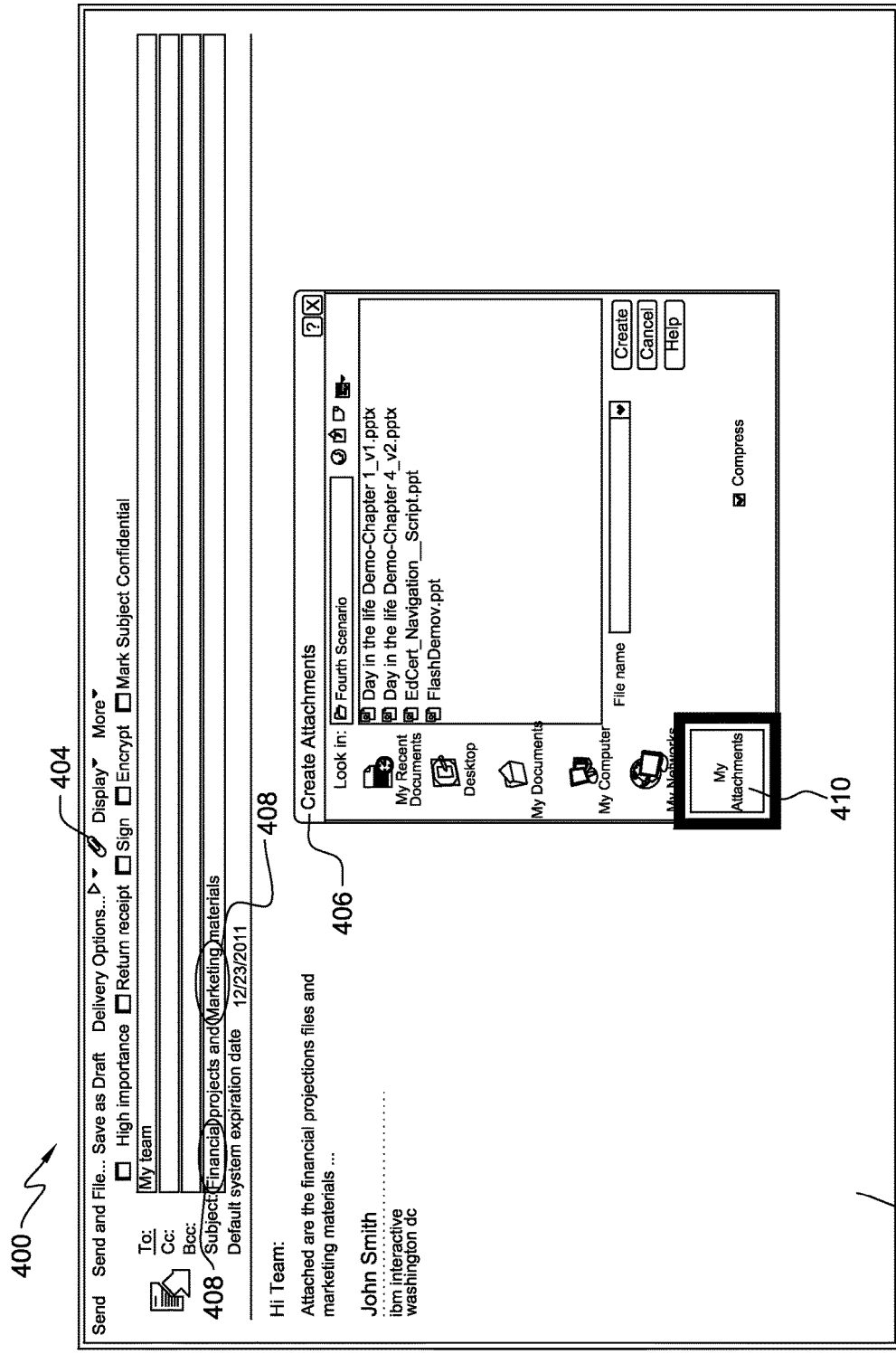
FIGS. 4A-4B are an illustration of a display of a user interface for an e-mail client depicted in accordance with an illustrative embodiment.
Figure 4B:
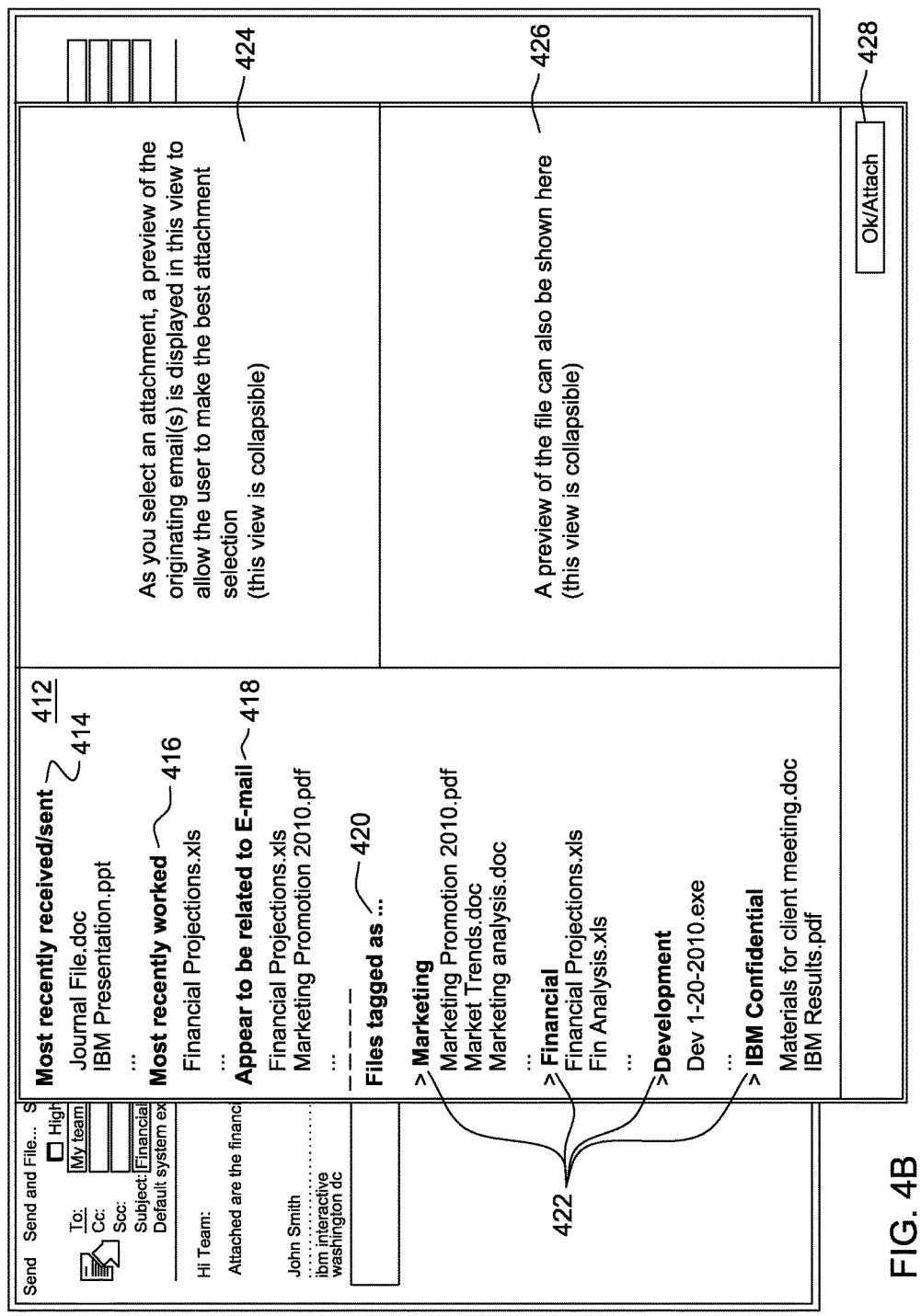

With reference now to FIGS. 4A-4B, an illustration of a display of a user interface for an e-mail client is depicted in accordance with an illustrative embodiment. While FIGS. 4A-4B illustrate a display of a user interface of an e-mail client, one of skill in the art will appreciate that, in other embodiments, the user interface may be an interface to another type of client for exchanging electronic messages, such as text messages and IMs, to which files may be attached, or to a web-based program for exchanging such electronic messages.

Display 400 is merely one example of a user interface such as 126 or 128 in FIG. 1 or 314 in FIG. 3. Here, display 400 provides a visualization of an unsent message, such as unsent message 312 in FIG. 3, being drafted along with pop-up lists and options that may be selected by a user.

E-mail message 402, in this example, includes buttons, headers, recipient lines, a subject line, as well as text being composed. In other embodiments, element 402 may represent any other type of electronic message, such as a text message or IM, to which files may be attached. In addition, e-mail message 402 may be visually represented in display 400 in many different manners in other embodiments. Attach file button 404, when selected, opens create attachments box 406. A person skilled in the art will recognize that a wide number of schemes exist which would allow a user to select a file to attach. These schemes are intended to be within the scope of this invention.

Attachment program 114 may distinguish key words 408 within the subject line of e-mail message 402 and save key words 408 as attributes of e-mail message 402, such as subject attributes 318 of unsent message 312 in FIG. 3. In another embodiment, attachment program 114 may save the entire subject line as an attribute. In another embodiment still, attachment program 114 may save words and phrases from text being composed as subject attributes of e-mail message 402.

Create attachments box 406 allows a user to attach a file from a local or network address, as do current electronic mail programs, and also includes a my attachments button 410, which allows a user to select from attachments to existing (stored) e-mail messages. In this embodiment, my attachments button 410 opens a file list display 412 showing attached files from existing e-mail messages, e.g., existing messages 334 of FIG. 3. In other embodiments, display 400 may open file list display 412 in response to the selection of attach file button 404 or a similar attach command.

The existing e-mail messages in various embodiments may be e-mail messages found in any location where e-mail messages may be stored (e.g. inbox, sent box, draft message folder, other folders, and any combination of the foregoing). In addition, the existing e-mail messages may be stored in a client system, such as client data processing system 302 of FIG. 3, or a server system, such as server data processing system 304 of FIG. 3 in different embodiments.

File list display 412 may show all of the files attached to the existing e-mail messages or some of the files attached to the existing e-mail messages with an option to "show all." Files shown in the file list display 412 may be sorted in any fashion (i.e. alphabetical, by size, by file type), or may be sorted in a manner to make it more likely that the desired file or files to attach to e-mail message 402 appears near the top of file list display 412. Techniques for sorting file list display 412 include: most recently received/sent 414, most recently worked with 416, appear to be related to e-mail being drafted 418, by file tags 420, or any combination of the foregoing. File list display 412 may first show the sorting options and require a user to select one of the sorting options before displaying the list of files, or in another embodiment, file list display 412 may display the list in a predefined manner (either preprogrammed or user defined) and allow the user to select a technique if desired. In another embodiment, file list display 412 may list multiple sorting techniques and groups of the first few files that would appear using those techniques, as shown in the illustrative embodiment of file list display 412. In this manner, it is likely that a user will see the desired file quickly and be able to select that file; if he or she wishes to look further in one of these groups, he or she may select the sorting technique to expand that grouping.

Technique 414 displays the files by the order in which the existing e-mail messages those files were attached to were received or sent. Most if not all e-mail messages are time stamped. In one embodiment, technique 414 does not differentiate between received and sent existing e-mail messages and displays a single list of files attached to sent or received messages ordered by time stamps of the sent and received messages. In another embodiment, technique 414 distinguishes between received and sent messages and displays a first list of files attached to received messages ordered by time stamps of the received messages and a second list of files attached to sent messages ordered by time stamps of the sent messages.

Technique 416 sorts the files in the order by which the files have been most recently worked on. If the files have been opened or edited, it is likely that these are the files that a user wishes to attach and send. The time that the file was worked on may be saved with information associated with the file, such as attachment information 338 in existing messages 334 in FIG. 3.

Technique 418 sorts the files by their similarity to the unsent e-mail message being drafted, e.g., unsent message 312 of FIG. 3. Technique 418 may compare attributes from the unsent e-mail message, such as the set of attributes 316 including subject 318 and list of recipients 320 in FIG. 3, to attributes in existing e-mail messages, such as subject information 336, attachment information 338, and recipient information 340 in existing messages 334 in FIG. 3.

Though tags on attached files may be stored, such as in attachment information 338, and used to determine potential similarity to the unsent e-mail message in technique 418, technique 420 sorts attached files based on which tags 422 on the attached files are similar to portions of the unsent e-mail message.

In one embodiment, attachment program 114 can include techniques 414-420 and can comprise program instructions for each of techniques 414-420. In other embodiments, attachment program 114 can include other techniques and can comprise program instructions for the other techniques, such as sorting by times of viewing of the existing e-mail messages, sorting by timestamps of most recent revisions of attached files, similarity between subject lines, message bodies, key phrases, key words, and/or tags of existing e-mail messages, and similarity of addressee lists of existing e-mail messages to an addressee of the unsent e-mail message.

When a file in file list display 412 is selected, a preview pane 424 of the existing e-mail message to which the selected file is attached may be shown, and a preview pane 426 of the selected file may be shown. These previews allow user to re-familiarize himself or herself with the content of the existing e-mail message to which the selected file is attached and the selected file, ensuring that the user has selected the correct file. In one embodiment, preview panes 424 and 426 are collapsible. In another embodiment, display 400 may be devoid of one or both of preview panes 424 and 426. In yet another embodiment, preview panes 424 and 426 may be textual descriptions, key words, excerpts, or any combination of the foregoing. In another embodiment, multiple files may be selected at once and preview panes 424 and 426 may split their space accordingly.

Upon reviewing preview pane 424 and 426 the user may confirm to attach 428 the file or files. A person of skill in the art will understand that in some embodiments, where display 400 is devoid of one or both of preview panes 424 and 426, the selection of the file may simultaneously act as the confirmation. A person of skill in the art will also understand that this is merely one potential orientation of file list display 412, and that file list display 412 may in fact be shown in a variety of manners and with a variety of descriptive elements.

Figure 5:
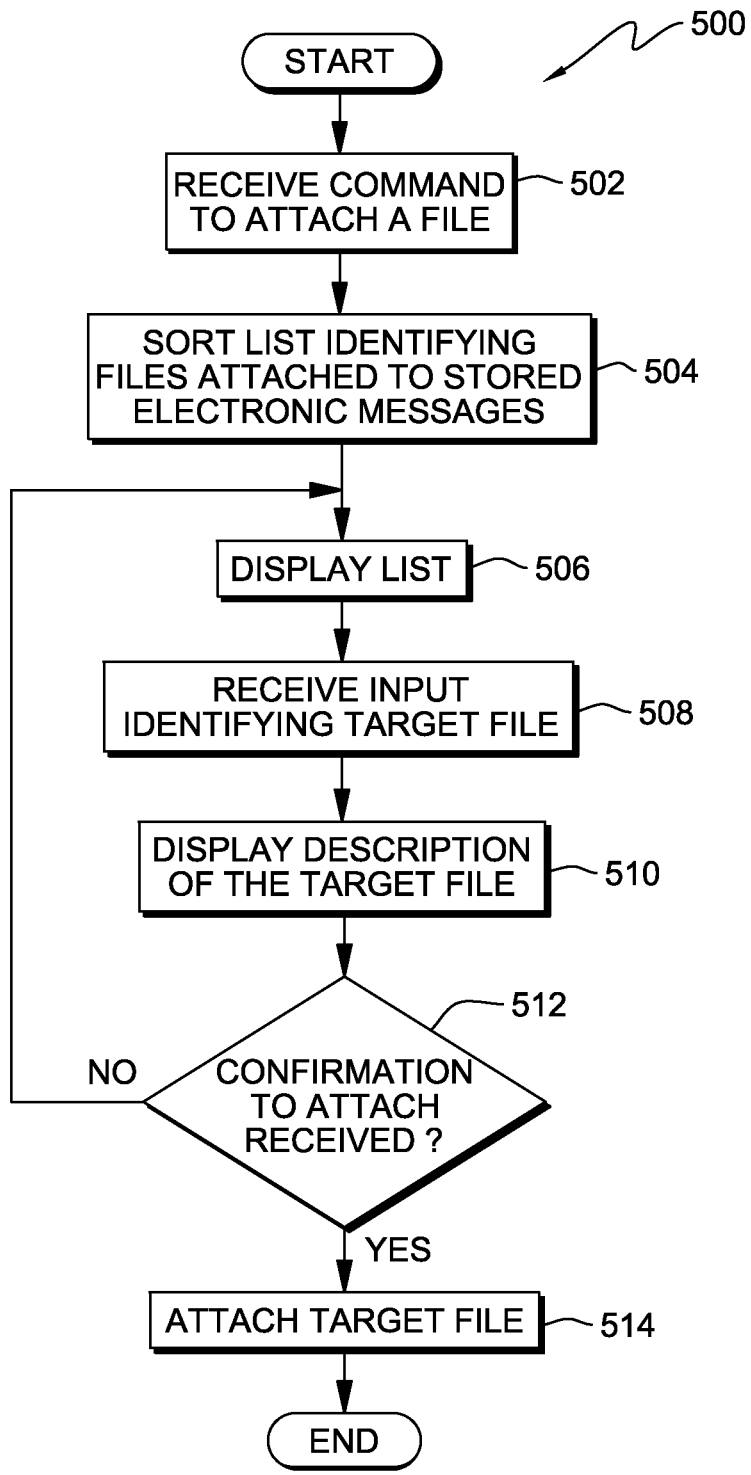
FIG. 5 is a flowchart of a process for associating an unsent electronic message with a target file that is attached to a first stored electronic message.

Referring now to FIG. 5, a flowchart of a process for associating an unsent electronic message with a target file that is attached to a first stored electronic message is depicted in accordance with an illustrative embodiment. In one embodiment, attachment program 114 as shown in FIG. 1, may perform the steps of process 500. In a preferred embodiment, the unsent electronic message is an unsent e-mail message. In another embodiment, the unsent electronic message may be a text message or an IM.

Process 500 begins by receiving a command to attach a file (step 502) to the unsent electronic message. In one embodiment, the command may be received in response to a user selecting a menu option to attach, such as attach file button 404 or my attachments button 410 in FIG. 4A, on a user interface. The user interface may be, for example, user interface 314 on client data processing system 302 of FIG. 3.

Process 500 may then sort a list identifying one or more files attached to one or more stored electronic messages (step 504), wherein the target file (i.e. the file to be attached) is one of the one or more files. The list may be sorted by a variety of techniques. The techniques may include the following techniques previously discussed herein: by the stored electronic message most recently received/sent as identified by timestamps of each stored electronic message, by a time of viewing the stored electronic message or file attached to the stored electronic message, a timestamp of the most recent revision of each file attached to a stored electronic message, by similarities between the unsent electronic message and the stored electronic messages, or by file tags.

After the step of receiving the command to attach a file (step 502) and sorting the list identifying files attached to stored electronic messages (step 504), process 500 displays the list (step 506).

After the step of displaying the list (step 506), process 500 receives an input identifying the target file. The target file may be identified through receipt of a user selection. In another embodiment, multiple target files may be identified for attachment to the unsent electronic message.

In response to receiving the input identifying the target file (step 508), process 500 may display a description of the target file (step 510). The description of the target file may be details and/or a preview of the target file. In another embodiment, the description of the target file may also include a description of the stored electronic message to which the target file is attached. The description may be viewed in preview panes, such as preview panes 424 and 426 in FIG. 4B. In other embodiments, the description may be viewed as textual descriptions, key words, excerpts, or any combination of the preceding. In another embodiment, process 500 may be devoid of such a display.

In response to displaying the description of the target file (step 510), process 500 may receive a confirmation to attach, to the unsent electronic message, the target file (decision block 512). If no confirmation is received, process 500 moves to step 506 to continue displaying the list identifying files attached to stored electronic messages.

After receiving a confirmation to attach, process 500 attaches, to the unsent electronic message, the target file or a file that identifies a location of the target file (step 514). Attaching the target file may comprise copying or embedding the target file in the unsent electronic message, so that the target file may be uploaded (replicated) with the unsent electronic message to a server, such as server data processing system 304 in FIG. 3. Attaching the file that identifies the location of the target file can comprise copying or embedding the file that identifies the location of the target file in the unsent electronic message, and including in the file the location of the target file on a storage device. In one embodiment, the storage device can be on a server, such as server data processing system 304 in FIG. 3. In another embodiment, the file can be displayed in the unsent electronic message as an icon or file name of the target file.

In another embodiment, process 500 may attach, to the unsent electronic message, the target file or the file that identifies the location of the target file (step 514), after the step of receiving the input identifying the target file (step 508).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block diagrams and flowcharts may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for associating an unsent electronic message with a first file that is attached to a first electronic message stored in an account, the method comprising the steps of:
    a computer receiving a command to attach an attachment to the unsent electronic message stored in a memory;
    the computer sorting a list identifying the first file and a second file attached to a second electronic message stored in the account, the sorting comprising ranking the first file higher than the second file in response to determining that one or more attributes of the first stored electronic message are more similar to one or more attributes of the unsent electronic message than are one or more attributes of the second stored electronic message, wherein the determining comprises determining the following:
    similarity of a subject line of the first stored electronic message and a subject line of the second stored electronic message to a subject line of the unsent electronic message;
    similarity of a message body of the first stored electronic message and a message body of the second stored electronic message to a message body of the unsent electronic message;
    similarity of a key phrase of the first stored electronic message and a key phrase of the second stored electronic message to a key phrase of the unsent electronic message;
    similarity of a key word of the first stored electronic message and a key word of the second stored electronic message to a key word of the unsent electronic message;
    similarity of a tag of the first stored electronic message and a tag of the second stored electronic message to a tag of the unsent electronic message; and
    similarity of an addressee list of the first stored electronic message and an addressee list of the second stored electronic message to an addressee list of the unsent electronic message;
    the computer displaying the sorted list, the displaying comprising displaying an identifier of the higher ranked first file more prominently than an identifier of the second file;
    the computer, after the step of displaying the sorted list, receiving an input identifying the first file; and
    the computer, after the step of receiving the input identifying the first file, associating the unsent electronic message with the first file.

2. The method of claim 1, further comprising:
    the computer displaying an additional list concurrently with the displayed sorted list, wherein the additional list lists the first and second files according to an alternate ranking.

3. The method of claim 2, wherein the alternate ranking ranks the first and second files based on a time of viewing the first stored electronic message and a time of viewing the second stored electronic message.

4. The method of claim 2, wherein the alternate ranking ranks the first and second files based on a time of viewing the first file and a time of viewing the second file.

5. The method of claim 1, further comprising the step of the computer concurrently displaying the unsent electronic message and an indicator of the first file on a display.

6. The method of claim 1, further comprising the steps of:
    the computer, in response to receiving the input identifying the first file, displaying a description of the first file; and
    the computer, in response to displaying the description of the first file, receiving a confirmation to associate the first file with the unsent electronic message.

7. The method of claim 1, further comprising the computer displaying a preview of the first stored electronic message, the preview including at least a portion of a message body of the first stored electronic message.

8. The method of claim 1, wherein the associating comprises attaching, to the unsent electronic message, a file that identifies a location of the first file on a storage device.

9. A computer program product for associating an unsent electronic message with a first file that is attached to a first electronic message stored in an account, the computer program product comprising:

one or more computer-readable tangible storage devices;

program instructions, stored on at least one of the one or more storage devices, to receive a command to attach an attachment to the unsent electronic message stored in a memory;

program instructions, stored on at least one of the one or more storage devices to, sort a list identifying the first file and a second file attached to a second electronic message stored in the account, the sort instructions comprising program instructions to rank the first file higher than the second file in response to determining that one or more attributes of the first stored electronic message are more similar to one or more attributes of the unsent electronic message than are one or more attributes of the second stored electronic message, wherein the determining comprises determining the following:

similarity of a subject line of the first stored electronic message and a subject line of the second stored electronic message to a subject line of the unsent electronic message;

similarity of a message body of the first stored electronic message and a message body of the second stored electronic message to a message body of the unsent electronic message;

similarity of a key phrase of the first stored electronic message and a key phrase of the second stored electronic message to a key phrase of the unsent electronic message;

similarity of a key word of the first stored electronic message and a key word of the second stored electronic message to a key word of the unsent electronic message;

similarity of a tag of the first stored electronic message and a tag of the second stored electronic message to a tag of the unsent electronic message; and similarity of an addressee list of the first stored electronic message and an addressee list of the second stored electronic message to an addressee list of the unsent electronic message;

program instructions, stored on at least one of the one or more storage devices, to display the sorted list such that an identifier of the higher ranked first file is displayed more prominently than an identifier of the second file;

program instructions, stored on at least one of the one or more storage devices to, after displaying the sorted list, receive an input identifying the first file; and program instructions, stored on at least one of the one or more storage devices to, after receiving the input identifying the first file, associate the unsent electronic message with the first file.

10. The computer program product of claim 9, further comprising program instructions, stored on at least one of the one or more storage devices, to concurrently display the unsent electronic message and an indicator of the first file on a display.

11. The computer program product of claim 9, further comprising:

program instructions, stored on at least one of the one or more storage devices to, in response to receiving the input identifying the first file, display a description of the first file; and program instructions, stored on at least one of the one or more storage devices to, in response to displaying the description of the first file, receive a confirmation to associate the first file with the unsent electronic message.

12. The computer program product of claim 9, further comprising:

program instructions, stored on at least one of the one or more storage devices, to display an additional list concurrently with the displayed sorted list, wherein the additional list lists the first and second files according to an alternate ranking.

13. The computer program product of claim 9, further comprising:

program instructions, stored on at least one of the one or more storage devices, to display a preview of the first stored electronic message, the preview including at least a portion of a message body of the first stored electronic message.

14. A computer system for associating an unsent electronic message with a first file that is attached to a first electronic message stored in an account, the computer system comprising:

one or more processors, one or more computer-readable memories, and one or more computer-readable tangible storage devices;

program instructions, stored on at least one of the one or more storage devices for execution by at least one of the one or more processors via at least one of the one or more memories, to receive a command to attach an attachment to the unsent electronic message stored in a memory;

program instructions, stored on at least one of the one or more storage devices for execution by at least one of the one or more processors via at least one of the one or more memories to, sort a list identifying the first file and a second file attached to a second electronic message stored in the account, the sort instructions comprising program instructions to rank the first file higher than the second file in response to determining that one or more attributes of the first stored electronic message are more similar to one or more attributes of the unsent electronic message than are one or more attributes of the second stored electronic message, wherein the determining comprises determining the following:

similarity of a subject line of the first stored electronic message and a subject line of the second stored electronic message to a subject line of the unsent electronic message;

similarity of a message body of the first stored electronic message and a message body of the second stored electronic message to a message body of the unsent electronic message;

similarity of a key phrase of the first stored electronic message and a key phrase of the second stored electronic message to a key phrase of the unsent electronic message;

similarity of a key word of the first stored electronic message and a key word of the second stored electronic message to a key word of the unsent electronic message;

similarity of a tag of the first stored electronic message and a tag of the second stored electronic message to a tag of the unsent electronic message; and similarity of an addressee list of the first stored electronic message and an addressee list of the second stored electronic message to an addressee list of the unsent electronic message;

program instructions, stored on at least one of the one or more storage devices for execution by at least one of the one or more processors via at least one of the one or more memories, to display the sorted list such that an identifier of the higher ranked first file is displayed more prominently than an identifier of the second file;

program instructions, stored on at least one of the one or more storage devices for execution by at least one of the one or more processors via at least one of the one or more memories to, after displaying the sorted list, receive an input identifying the first file; and program instructions, stored on at least one of the one or more storage devices for execution by at least one of the one or more processors via at least one of the one or more memories to, after receiving the input identifying the first file, associate the unsent electronic message with the first file.

15. The computer system of claim 14, further comprising:
program instructions, stored on at least one of the one or more storage devices for execution by at least one of the one or more processors via at least one of the one or more memories to, in response to receiving the input identifying the first file, display a description of the first file; and program instructions, stored on at least one of the one or more storage devices for execution by at least one of the one or more processors via at least one of the one or more memories to, in response to displaying the description of the first file, receive a confirmation to associate the first file with the unsent electronic message.

16. The computer system of claim 14, further comprising:
program instructions, stored on at least one of the one or more storage devices for execution by at least one of the one or more processors via at least one of the one or more memories, to display an additional list concurrently with the displayed sorted list, wherein the additional list lists the first and second files according to an alternate ranking.

17. The computer system of claim 14, further comprising:
program instructions, stored on at least one of the one or more storage devices for execution by at least one of the one or more processors via at least one of the one or more memories, to display a preview of the first stored electronic message, the preview including at least a portion of a message body of the first stored electronic message.

* * * * *